Figures 3, 4:
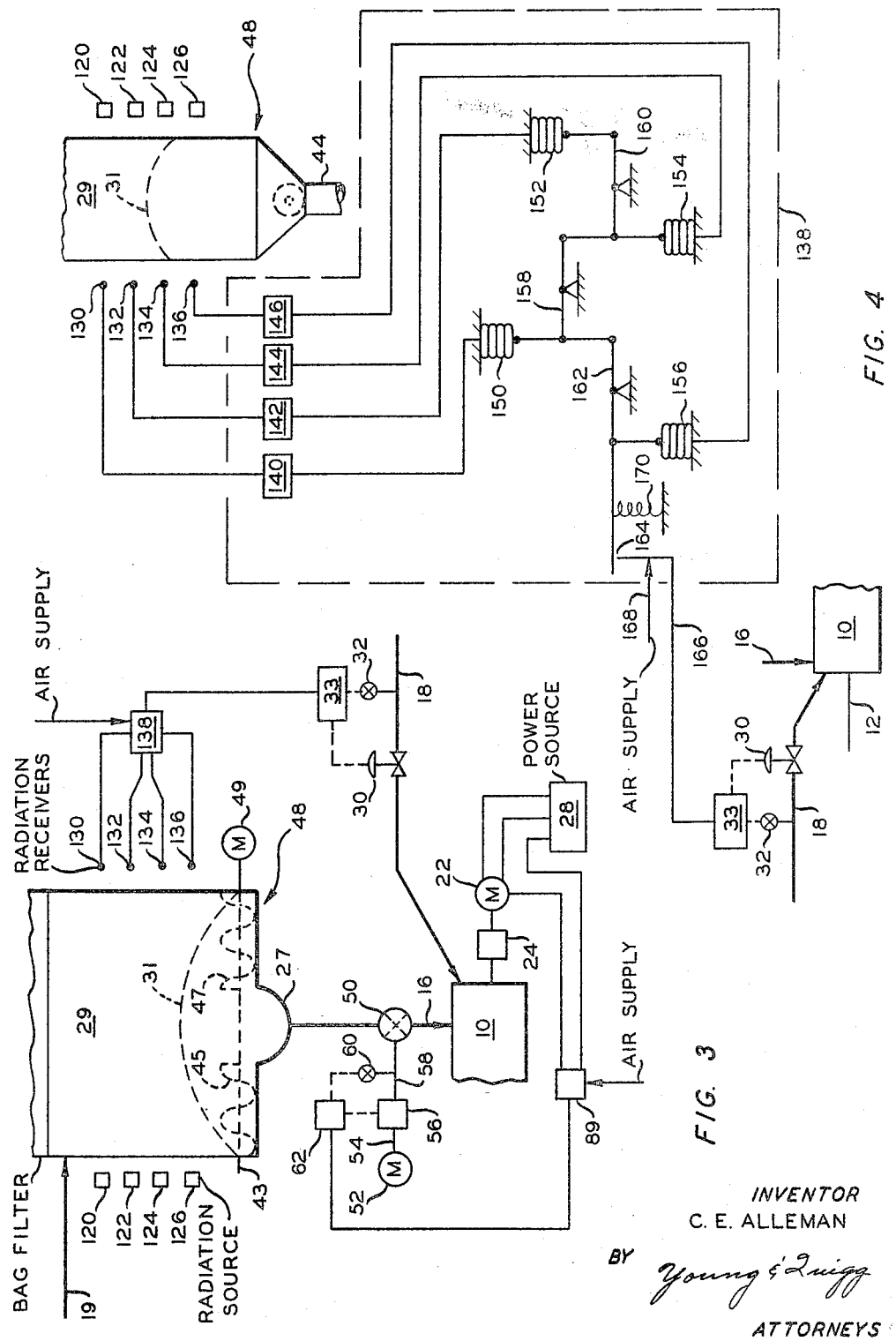

Aug. 16, 1966  C. E. ALLEMAN  3,266,873
CARBON BLACK PELLETING BY CONTROLLING POWER
TO THE PELLETIZER MOTOR
Filed April 1, 1963  2 Sheets-Sheet 1
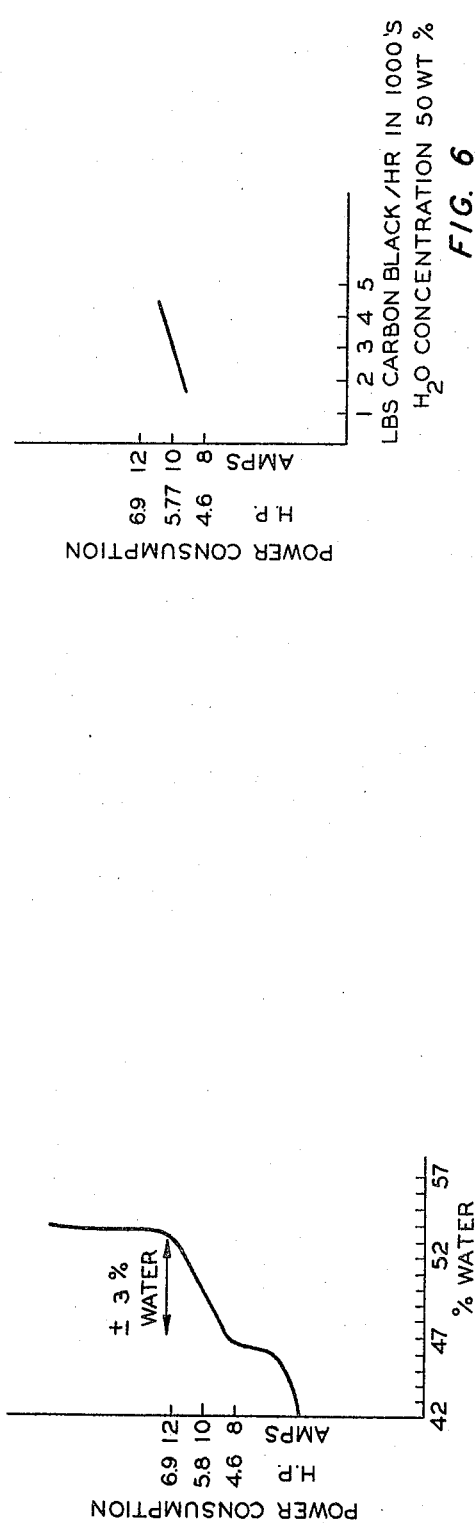
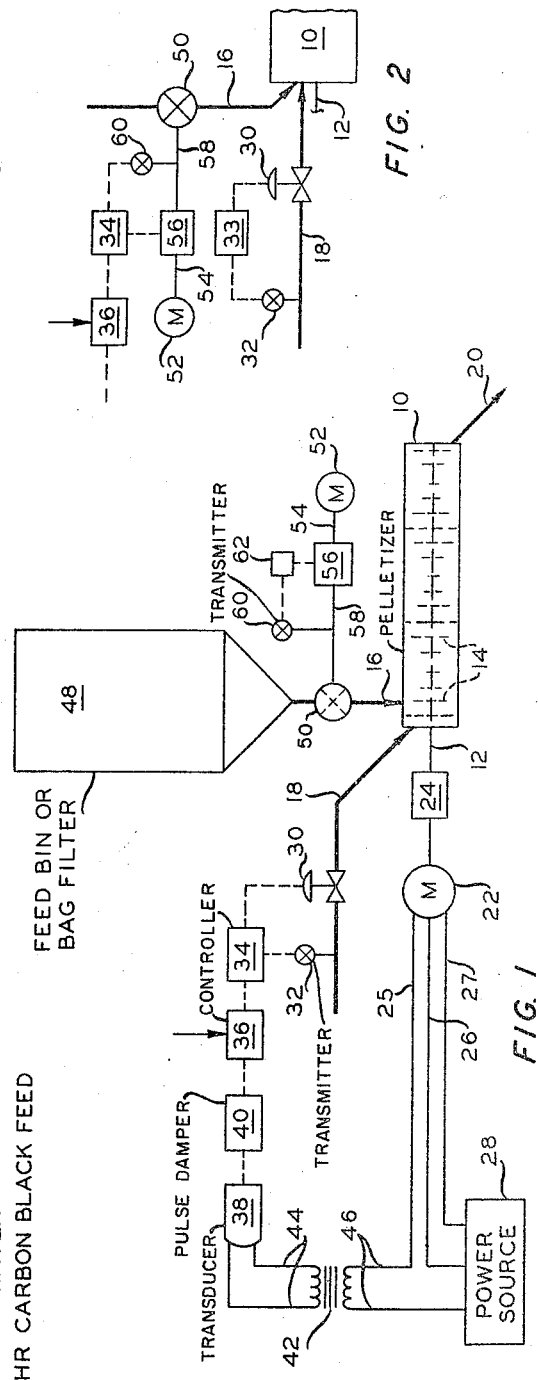
INVENTOR.
C. E. ALLEMAN
BY
*Young & Quigg*
ATTORNEYS INVENTOR
C. E. ALLEMAN
BY Young & Quigg
ATTORNEYS

3,266,873
CARBON BLACK PELLETING BY CONTROLLING POWER TO THE PELLETIZER MOTOR
Carl E. Alleman, Bartlesville, Okla., assignor to Phillips Petroleum Company, a corporation of Delaware
Filed Apr. 1, 1963, Ser. No. 269,248
17 Claims. (Cl. 23—314)

This application is a continuation-in-part of my copending application S.N. 128,445, filed August 1, 1961.

This invention relates to a process and arrangement of apparatus for the control of the wet pelleting of water-insoluble powdered materials such as carbon black, metal compounds, catalyst powders, etc.

While the ensuing disclosure deals specifically with carbon black, it is to be understood that the invention is also applicable to other powdered or finely comminuted materials.

It is conventional to wet pellet carbon black in various types of pelleting mills or drums. One process utilizes a pelletizer-mixer substantially in the form of a pug mill. This device comprises an elongated cylindrical shell or drum having an axial shaft extending therethru with rods extending radially from the shaft in a spiral pattern longitudinally thereof. The rods are originally chisel pointed and extend to within a short distance of the shell so that upon rotation of the mill, the water and black introduced to the mill are thoroughly mixed and agitated. This procedure forms wet pellets when the proper proportions of water and black are introduced to the mill. It is well known that in order to make pellets with this technique, the water should be maintained close to an optimum concentration within the range of 40 to 60 weight percent of the mixture and the quality of the pellets is better if the water content is maintained within ±2 weight percent of this optimum.

It would seem that no difficulty would be experienced in maintaining the proper proportions of water and black in a pelletizer for efficient wet pelleting. However, this is not the case for, while it is relatively simple to control the rate of flow of water or aqueous liquid (molasses-water solution), it is much more difficult to maintain a constant rate of flow of flocculent carbon black to a process or to a pelletizer. Current practice in carbon black plants involves feeding the black from a large surge bin thru a star valve in a line to the pelletizer. Improved practice involving either intermittently feeding a blast of gas thru the star valve (termed pulsing) to prevent bridging of the black or feeding the black directly from the bag filter unit thru a star valve in a short line to the pelletizer has resulted in improved control of flow rate of black even with varied black production rates.

This invention is concerned with a process and arrangement of apparatus for controlling the wet pelleting of powdered materials and, particularly, carbon black so that pellets of better than conventional average quality are consistently produced.

Accordingly, it is an object of the invention to provide an improved process and arrangement of apparatus for the wet pelleting of powdered materials and, particularly, carbon black. Another object is to provide an improved process and apparatus for proportioning the flow of aqueous liquid and the flow of carbon black to such a wet pelleting process. A further object is to provide a process and apparatus for wet pelleting of carbon black which improves the quality of the pellets and increases the pelleting capacity of a pelletizer. An additional object is to provide improved control of the outlet temperature of the pellets from the pellet dryer downstream of the pelletizer. It is also an object to provide more uniform water content of the pellets which facilitates more efficient operation of the pellet dryer. Other objects of the invention will become apparent to one skilled in the art upon consideration of the accompanying disclosure.

A broad aspect of the invention comprises controlling the flow of one of water or aqueous liquid and powdered material to a wet pelleting process (while maintaining the other relatively constant) in response to the power required to operate the pelletizer at a substantially constant pelleting speed. The shaft of a pug mill type pelletizer is commonly rotated by an electric motor and it has been found by careful and extended study that the power or current supplied to the motor varies as the proportions of water and black vary from an optimum water concentration in the range of 40 to 60 weight percent of the black-water mix. Higher concentrations of water than the optimum in this range require more power than lower concentrations. As the flow rate of either loose black or aqueous liquid unavoidably varies, the water concentration in the pelletizer changes and this is quickly observable on an ammeter or power measuring instrument in circuit with the motor as well as in the character of the pellets. Hence, the wet pelleting process can be efficiently controlled by observing a recording ammeter or power sensing instrument on the electric motor circuit and varying either the flow rate of black or liquid to restore the proper power consumption. This may be accomplished by operating a valve in the water line leading to the pelletizer so as to decrease the flow of water when the power increases and increase the flow of water when the power decreases below a standard level for making good pellets. It may also be accomplished by manipulating the rate of feeding black to the process while holding the water flow rate relatively constant.

To illustrate, with a given pelletizer in commercial use in a carbon black plant, it was noted that good pellets were constantly and consistently produced when the recording ammeter connected in the motor circuit read from 8½ to 9½ amps and that any departure from this range resulted in pellets which were too dry or too wet to be acceptable. Good pellets are indicated when no dust appears in a sample to indicate dryness, when the maximum pellet size is about 3mm. and when their surface is not shiny enough to indicate extra high moisture. These characteristics give a product which, when dried, normally meets the specification of 40 p.s.i.g. minimum pack point and 20 to 23 lb./cu. ft. density. The small pellet size seems to be a suitable form of pellet that results when the black and solution feed rates are steady and in the right ratio. These small pellets are desirable also because they dry easily. When the water-to-black ratio is not such that the water is in the specified range or is rapidly changing, much larger pellets, ranging up to 10 mm. diameter, will result much of the time.

The 8½ to 9½ amp range applied to a new pelletizer 10 feet long and 20″ in diameter with 18″ rods extending radially thru the rotor shaft and having chisel shaped ends. Good pellets were continuously made at 8½ to 9½ amps with a rotor speed of 340 r.p.m. and also with a rotor speed of 310 r.p.m. The same amp range applied for all aqueous molasses solution rates from 850 to 1500 lbs./hr., varied to compensate for changes in black feed rate. Similar results were obtained on a second pelletizer in a commercial plant, but only a single speed of 340 r.p.m. was tested.

A more complete understanding of the invention may be had by reference to the accompanying schematic drawing of which FIGURE 1 shows a preferred arrangement of apparatus for performing the invention, FIGURE 2 is a view of another embodiment of the invention; FIGURE 3 is a view of a further embodiment of the invention; FIGURE 4 is a view showing further details of control elements of FIGURE 3; FIGURE 5 is a graph representing the relationship of power consumed and water concentration in carbon black in a standard pelleting process; and FIGURE 6 is a graph representing the relationship of power consumed at a water concentration of 50 wt. percent and various black feed rates.

Referring to the drawing, a pelletizer 10 in the form of a pug mill about 10′ long and 20″ I.D. is provided with an axial shaft 12 on which are positioned 18″ long rods or pins 14 arranged in a longitudinal spiral. Black feed line 16 enters the front end of the pelletizer along with water line 18 and effluent line 20 passes wet pellets to equipment (not shown) downstream for polishing and drying the pellets.

An electric motor 22 connects thru suitable gear box 24 with the shaft 12 of the pelletizer for operating the rotor. Leads 25, 26, and 27 connect motor 22 with a suitable power source 28, usually an A.C. current source.

Positioned in water line 18 are a motor valve 30 and an indicating flow transmitter 32. A receiver-controller 34, also designated in the art as flow-receiver-controller, controls the amount of opening of valve 30. A second receiver-controller 36 is operatively connected with receiver-controller 34 and with an electro-pneumatic transducer 38 thru a pressure pulsation damper 40. Instrument 38 is connected in circuit with one phase of motor 22 thru step-down transformer 42 and circuits 44 and 46. Instruments 30, 32, 34, 36, and 38 are pneumatic, being supplied with 20 pound air in conventional manner. Instrument 38 may contain an ammeter-recorder and a transducer which puts out a 3 to 15 lb. air signal, the value depending upon the current passing thru line 25. Instrument 38 may also be a thermal converter. This type of instrument is available thru Leeds & Northrup Company, Philadelphia, Pa., Bulletin 77-39-0-2. This type of instrument is also disclosed in Considine, "Process Instruments and Controls Hand Book," Sec. 8. pp. 57 and 64, McGraw-Hill Book Company, N. Y., 1957. The thermal converter measures power and takes into consideration the current, voltage, and power factor.

An arrangement of apparatus illustrated in the drawing was set up to operate on a 20′ diameter, 10′ long pelletizer of the pug mill type having 18″ long rotor pins with chisel points, operated at a rotor speed of 330 r.p.m. by a Louis Allis gear motor 213A-Duty Class I, 1760 r.p.m., 10 H.P. 440 v., 3 phase, 60 cycle. Instrument 38 was a Taylor, Type 701TG131 electro-pneumatic transducer. This instrument was connected to one phase of the circuit of motor 22 thru a Westinghouse Type OC-133 Current Transformer. Instrument 40 was a Taylor No. 588104 Pressure Pulsation Damping unit. Instruments 34 and 36 were Taylor 35JF842 Receiver W/402RF1042 Controller. Instrument 32 was a Fischer & Porter No. 10A1152-1401KA41 Indicating Flow Transmitter.

In the arrangement described and shown, instrument 38 senses the current flow (which is substantially proportional to power) in line 25 or in one phase of 3-phase motor 22 and emits a pneumatic signal responsive thereto and substantially proportional to the current in amperes. This signal passes thru damping unit 40 which smooths out sever fluctuations and passes the damped signal to primary or master controller 36 which, in cooperation with its set point, emits an air signal in the range of 3 to 15 p.s.i.g. to secondary or slave controller 34. Controller 34 receives a signal from indicating flow transmitter 32 in proportion to the flow of aqueous molasses solution flowing thru line 18. Controller 34 then adjusts the position of valve 30 so as to proportion the flow rate of solution to the flow rate of black passing to the pelletizer so that a certain mixing power is expended to operate the rotor in pelletizer 10.

Actually, a cascade system control is involved wherein instrument 36 is the master or primary controller which controls instrument 34 as a secondary or slave controller. The signal emitted by instrument 36 is a demand signal for a specific rate of flow of water or aqueous solution in line 18. Controller 34 compares the signal from controller 36 with the signal from flow-transmitter 32 (the actual flow in line 18) and, if the flow is below or above the demand signal from instrument 36, instrument 34 changes the setting of valve 30 to increase or decrease the flow rate until the signal from flow transmitter 32 corresponds with the signal from instrument 36.

The current (or power) as measured by the system comprising transformer 42, current transducer 38, and controller 36 in cooperation with the set point of controller 36 continues to adjust the signal emitted to controller 34 until the measured current is substantially equal to the set point current.

Star valve 50 (or other feeder) may be operated at a constant predetermined rate by motor 52 on shaft 54 which connects thru variable speed transmission 56 with shaft 58 to drive the feeder. Speed transmitter 60 senses the speed of shaft 58 and emits a signal to controller 62 which controls transmission 56 at the speed of the set point of controller 62.

The flow of carbon black may be controlled by adjusting the set point of controller 62. In plant operation, star valve 50 has been operated to feed over the whole range from about 1200 to about 3300 lbs. of black/hour. The indicating flow transmitter 32 is capable of handling 0 to 4,000 lbs./hr. of aqueous molasses solution (containing 0.5 to 3, preferably 1 to 1½ wt. percent of molasses). The maximum range of current indication observed in several weeks operation has been from 8½ amps for 1500 lbs./hr. solution rate to 10½ amps for 3300 lbs./hr. solution rate. During this time there was usually a minute-by-minute fluctuation of ±½ amp to ±1 amp. This fluctuation was always reflected by comparable spread of pellet sizes, indicating pellet size as well as amps responds in less than a minute to ratio changes. In fact, the rate of response is 5–10 seconds from change in black rate to the resulting change in water rate. This response rate was determined by timing the air blasts into the star valve and comparing the water rate changes therewith. (Blast air serves to dislodge loose black in the bin and chute, but it was found that it stops the black flow during each blast and continues the flow when the blast stops.)

The arrangement of apparatus illustrated in FIGURE 2 maintains water flow to pelletizer 10 relatively constant and varies the flow rate of black thru line 16 in response to changes in power required to operate the pelletizer under good pelleting conditions. The flow rate of water in line 18 is regulated by motor valve 30 which is controlled by controller 33, this controller being sensitive to a rate of flow signal from flow rate transmitter 32 in the water line.

The speed of feeder 50 is varied by controlling the speed of variable speed transmission 56. Controller 34 receives a signal from speed transmitter 60 proportional to the speed of shaft 58 and also a demand signal from controller 36 which varies with the carbon black feed requirements to maintain the predetermined constant power input to motor 52 as sensed by the system illustrated and described in relation to FIGURE 1. It is feasible to reset the set point of controller 36 for different levels of carbon black in bin 48 and make the necessary change in water flow rate by resetting controller 33.

The carbon black may also be fed directly from the bag filter upstream of bin 48 as disclosed in my copending application Serial No. 270,060, filed April 2, 1963.

Referring to FIGURE 3, a control arrangement is shown similar to that of FIGURE 2 but which permits resetting of the water flow rate thru line 18, step-wise periodically, as the level of black 31 in compartment 29 rises and falls with production in the carbon black reactors. Left and righthand screws 45 and 47 on conveyor 43 auger the black into a sump 27 from which line 16, containing star valve 50, leads to pelletizer 10. Since the rate of production of black will vary within reasonable limits, the rate of feeding black to pelletizer 62 will desirably be varied periodically in order to compensate for these variations in rate of production of carbon black.

The controls shown in FIGURE 3 are substantially the same for the feeder 50 in line 16 as shown in FIGURE 2, box 89 containing transformer 42, electro-pneumatic transducer 38, pulse damper 40, and controller 36. This arrangement varies the rate of operation of star valve or feeder 50, with the water rate in line 18 substantially constant, so as to maintain the power input to motor 22 relatively constant. The operation of this system has previously been described. However, when the level of black in compartment 29 varies within certain limits, the additional controls shown effect a step-wise change in the water flow rate in line 18 so as to require the feeding of black at a slower or faster rate into the pelletizer in order to maintain the set power requirement for forming good pellets.

The system of controls devised for resetting motor valve 30 in line 18 comprises a series of radiation sources 120, 122, 124, and 126 and corresponding radiation receivers 130, 132, 134 and 136 at corresponding levels of compartment 30. These radiation receives feed into box 138, the details of which are shown in FIGURE 4, and described below. As the level of black 31 varies from one level detector to the other, the control system resets valve 30 by means of a signal emitted by box 138 to controller 33. As the level of black rises in compartment 29 to the next higher detecting level, there is a need for feeding black thru feeder 50 at a faster rate in order to prevent undue build-up of black in compartment 29. Hence, in response to a rise in black level 31 to the next higher indicating level, instrument 138 emits a signal which causes controller 33 to increase the opening of motor valve 30 a predetermined amount and if the level 31 of black rises further to the next detection level, the control system makes another increased step-wise adjustment in the water flow rate in line 18. Conversely, as the level of black recedes from one detection level to another, the controls reset valve 30 at a lower flow rate in step-wise fashion from detection level to detection level.

The step-wise adjustment of water flow rate may be of the order of 10 to 40 gallons per hour when feeding approximately 3,000 lb./hr. of black to the pelletizer. Usually, an adjustment of 25 gallons per hour when black level changes from one detection level to the other is sufficient to accommodate production rate changes.

In FIGURE 4 the radiation level detecting device is shown in relation to compartment 29 of bag filter 48 similarly to FIGURE 3. Box 138 includes electro-pneumatic transducers 140, 142, 144, and 146 which are connected with radiation receivers 130, 132, 134, and 136, respectively, to receive a decreased signal therefrom when the level of black 31 rises to the different detection levels at which the receivers are positioned. These radiation level detecting devices are conventional and need no further discussion. The electro-pneumatic transducers convert an electrical signal to a pneumatic signal which changes as the black level 31 passes the detecting level either when rising or falling within compartment 30.

Transducer 140 emits a pneumatic signal to bellows 150 which applies pressure on levers 158 and 162. Likewise, transducers 142, 144, and 146 emit pneumatic signals which apply pressure on bellows 152, 154, and 156, respectively. Pressure on bellows 152 exerts a force on lever 160 which in turn applies pressure to levers 158 and 162. Pressure on bellows 154 exerts a force on lever 158 which is transmitted to lever 162, and pressure exerted on bellows 156 exerts a force directly on lever 162 to move the free end thereof away from a bleed-off orifice 164 in instrument air line 166 which is connected with air supply line 168. Lever 162 is biased toward orifice 164 by spring 170. As the bellows system increases or decreases the pressure on lever 162, the rate of bleeding air thru opening 164 is increased and decreased, respectively, so as to decrease and increase the pressure in line 166. This changes the air signal to controller 33 so as to change the setting of motor valve 30. Thus, as black level 31 rises from one indicator level to another, the air pressure in line 166 increases so as to increase the opening of valve 114 and demand more black. This actuates the control system on feeder 50 of FIGURE 3, causing increased flow of black. The reverse occurs when black level 31 drops from one indicator level to another.

When the carbon black level 31 is above the level of receiver 136 and below the level of receiver 134, bellows 150, 152, and 154 are exerting a force on the respective levers and on level 162 which is forcing the free end thereof farther away from orifice opening 164 in line 166 against the tension of spring 170 which provides a pneumatic signal of the required strength to maintain the desired setting of valve 114. As the carbon black level 31 rises above the level of receiver 134, the signal emitted by electro-pneumatic transducer 144 is greatly reduced so as to decrease the force applied by bellows 154 directly on lever 162 and the space between orifice 164 and the free end of the lever is reduced so as to increase the pressure in air line 166. This increases the opening of motor valve 114 thru the air signal on controller 33. Thus, as the level of black in compartment 29 rises due to increased production, the opening of motor valve 114 is increased, step-wise, so as to increase the flow rate of water and directly increase the flow rate of carbon black to compensate therefor as illustrated in connection with FIGURE 3.

Conversely, as the black level 31 recedes in compartment 29 below any of the indicating levels, the signal from the corresponding transducer is increased and pressure is again applied to lever 162 to increase the space between opening 164 and the free end of the lever thereby reducing the air pressure or force of the signal in line 166 and causing a step-wise reduction in the opening of valve 30.

The graph or curve of FIGURE 5 is self explanatory. The relationship of consumed power to water concentration is a straight line function for 50±3 wt. percent water. The power requirement goes up surprisingly for water concentrations upwards of about 53 wt. percent. Also, the power requirement drops off rapidly for water concentrations downwards of about 47 wt. percent. Better pellets are made when the water concentration is maintained within the range of 47 to 53 wt. percent. The desirability of operating at nearly 50% water concentrations is apparent.

The graph or curve of FIGURE 6 demonstrates the very modest effect of changes in feed rate of black over the range of 1500 to 4500 lbs. of black per hour on the power consumption while maintaining 50 wt. percent water concentration. This means that with reasonable control of black feed rate, the pelleting operation can be readily controlled in response to power consumption or amps used.

The discussion herein assumes that the optimum water concentration in carbon black is 50 wt. percent. However, it is pointed out that such is the case only for a medium structure black. High structure blacks have an optimum water concentration for good pelleting as high as 60 wt. percent and low structure blacks (such as furnace blacks) have an optimum water concentration as low as 40 wt. percent. The optimum water concentration for good pelleting must be determined by trial for each type of black.

Moreover the optimum water concentration for good pelleting for a given black need not be known in actual weight percent. Experienced workers in the art can determine the optimum water concentration for a given black by merely adjusting the feed rates of black and water until good pellets are being produced and by observing the characteristics of the pellets with respect to size, gloss, strength, etc. When optimum water concentration is found, the skilled operator can tell by pellet appearance when the water concentration varies as much as ±1 wt. percent. When operating in accordance with the invention, the water concentration can readily be maintained within a ±1 percent by weight of the optimum but variations of ±2 percent produce acceptable pellets.

The control arrangement of FIGURES 3 and 4 applies variable control on the flow of black into the pelletizer and step-wise adjustment of the water flow rate to compensate for variations in production of black in the reactors and recovery thereof in the bag filter. It is also feasible to apply the variable control arrangement to the water feed rate or manipulation of the motor valve in the water line and periodically effect a step-wise adjustment in the black feed rate by manipulating the controller on the feeder.

Using the control of FIGURE 1 and assuming a flow of 3,000 lbs./hr. of black thru line 16 into pelletizer 10, which flow will unavoidably vary somewhat, the set point on instrument 36 is set to provide a substantially constant power requirement for motor 22. This constant power requirement is reflected in a flow of solution equal to the flow of black i.e., 3,000 lbs./hr. As the flow of black decreases from the intended flow of 3,000 lbs./hr., there is more water in pelletizer 10 than the intended 50% of the total mix. This results in an increase in power required to operate rotor 12. The increase in power is sensed immediately by instrument 38 which emits a stronger signal to instrument 36 and this instrument emits a demand signal to instrument 34 for a change in flow rate of aqueous solution, requiring a lower flow rate than the existing flow rate. Instrument 34 compares the existing flow rate as sensed by instrument 32 with the signal from master controller 36 which indicates a need for a slower flow rate than indicated by instrument 32. Instrument 34 then emits a signal to diaphragm motor valve 30 which decreases the opening of the valve so as to decrease the flow rate in proportion to the change in signal emitted by master controller 36. When the flow of black in line 16 exceeds the intended rate of 3,000 lbs./hr., the system of controls operates similarly to place a demand signal on controller 34 for a faster water rate and instrument 34 compares the demand signal with the signal from instrument 32 and controls valve 30 in accordance therewith by opening same to provide the desired increased water flow rate.

The effect of the control process and system is surprising in that good pellets have been made continuously during the entire period of use and testing of the controls which has extended over several weeks. The pellets have been substantially free of dust and not unduly wet. This degree of control persisted in spite of some extended periods of fluctuations in black feed rate amounting to 900 lbs./hr. change in 5 minutes. During sharp decreases in back flow, the pellets were slightly wetter but not unduly wet; and during sharp increases in black rate, the pellets were slightly drier but not dusty. With normally stead black rates, the size of the pellets can, within normal limits, be set almost as desired by adjusting the master controller. A definite reading (on the ammeter) is required to produce the best pellets for a given mechanical condition for a given pelletizer and for a given black type and rate. However, the maximum range during the testing, with rates varying from 1500 lbs./hr. of solution rate to 3300 lbs./hr. solution rate was 8½ amps to 10½ amps.

With any intentional change in the rate of feeding black, such as a change from about 1500 to 3000 lbs./hr. the control system will automatically properly control the flow of solution. If the pellets being produced appear unduly shiny, the set point of the master controller can be changed to provide less water and if the produced pellets are too dry, as indicated by an exceptionaly dull appearance and a wider size range, the controller can be set to provide an increased flow of water. The following table presents pellet characteristics during the test period as compared with normal pellet production without the control system of the invention.

*Table*

| Pellet Characteristics | Test Period | Normal |
|---|---|---|
| Pack Point, lb. | 100+ | 80–100 |
| Density, lb./ft.³ | 23–24½ | 21–23 |
| Fines, max. percent | 0.4 | 1½ |

The foregoing table demonstrates the superior qualities of the pellets formed with the control system described herein in operation.

Another benefit derived from the invention is in the doubled capacity of the pelletizers. The designed rate of the black pelletizers is less than 1200 lbs./hr. of black but during the test the pelletizers on which the controls were installed handled 3300 lbs./hr. with no indications of being limited. Higher rates were not possible because of high stack temperatures produced on the downstream drier. This indicates that the designed thru-put of the pelletizers is at least trebled by using the automatic control system of the invention.

Earlier it was demonstrated that changes in pellet size usually are the chief factor in upsetting control of product temperatures. This agrees with a reasoned approach when it is realized that pellets in the rotary drier segregate according to size. Due to this segregation, the larger, harder-to-dry pellets ride quickly over the top of the bed in the drier and escape with a short residence time. With automatic ratio control the pellet size is kept steady. During the test this steady pellet size resulted in a constant product temperature within ±40° F.

A further advantage is in the high drier capacity made possible by steadier product temperature which permits operation of the drier at its maximum rate without hazarding wet product or fire-generation in the black. More than a 100,000 lb./day rate was attained in the drier, even through the designed capacity is 55,000 lbs./day, without exceeding the prescribed stack temperature.

Another advantage of the invention which is not readily apparent is in the relatively accurate indication of black feed rates which has never been accurately measured heretofore. The controller-recorder system faithfully showed all changes in the loose black feed rates. No other system has been devised for measuring black flow rates or changes therein from standard flow rates. This facilitates a study of devices and methods for feeding loose carbon black to a pelleting or similar process.

Other advantages downstream of the pelletizer were found to exist in the plant during the test. Less plugging occurred in the chute exit from the polisher as a result of too wet pellets. A 2¼ day run was made before it was necessary to rod-out this chute. Usually rodding-out is essential with each shift (every 8 hours). Also there was less black in the purge gas from the drier. After only two days on automatic ratio control the pressure drops in the purge gas filter were ½", 1", and 1¼ water gage, respectively, for compartments 1, 2 and 3. This compares with normal pressure drops of 1½" to 3½" water gage.

The invention is not limited to measuring electrical power or current used to rotate the pelletizer but is broad enough to include measuring any type of power or torque applied in rotating the pelletizer and increasing the water flow rate as the power decreases and vice versa.

In accordance with another embodiment of the invention, it is feasible to set the speed of feeder 50 (FIGURE 1) high enough to feed the black to pelletizer 62 as fast as screw 46 brings the black to it. This means that the black flow rate to the pelletizer is regulated only by the rate of production in the reactor(s). Variations in the rate of black thus fed to the pelletizer 62 are easily handled by the control system on the water rate in line 74 as described with reference to FIGURE 1. Thus, feeder 50, in this embodiment of the invention, performs only the function of a gas lock to maintain pressure in filter 26 while passing black therefrom. In this operation it is important to schedule the dumping of the various filter compartments sequentially so that stacking of one dump on another is avoided. In other words, the black from only one compartment at a time is fed to the pelletizer.

As a corollary, the hopper 30 will be essentially empty. This should be encouraged by installing vibrators on the sides of the hopper to prevent black collections thereon. Collection of black on the sides of the hopper encourages corrosion there and it tends to build up and slough off in "slugs." These slugs tend to upset the pelleting control and also interfer with quality control since some of this "stored" black gets into the product samples hours or even days after being produced and the samples are thus not representative of current products from the reactors.

In the foregoing disclosure and the appended claims the expression "substantially constant" with reference to the feed rate of the carbon black is to be interpreted as allowing for some fluctuation in this feed rate. It is virtually impossible to maintain the flow rate of black constant, but it can be maintained reasonably constant. The production rate of black in the reactors varies somewhat but this rate and the normal rate of recovery in the bag filter are to be regarded as within the scope of the term "substantially constant." In reality this term means not intentionally varied and includes rates which normally fluctuate within reasonable limits.

To illustrate, the production rate of carbon black in the reactors may vary ±500 pounds per hour from a normal rate of 3000 pounds per hour over a period of several hours. This is to be regarded as a "substantially constant" rate and the control on the flow rate of water to maintain the power input to the pelletizer (amps) as described herein compensates for these normal fluctuations in the black rate, even when feeding the black directly to the pellet mill from the filter as fast as it is recovered.

Certain modifications of the invention will become apparent to those skilled in the art and the illustrative details disclosed are not to be construed as imposing unnecessary limitations on the invention.

I claim:
1. In the process of wet pelleting carbon black comprising feeding said black and aqueous liquid at feed rates to provide a liquid concentration in the range of about 42 to 58 weight percent of the feed suitable for forming good pellets to a rotatable pelletizer-mixer rotating at a speed which forms wet pellets, the improvement comprising sensing the power (as a standard) required to rotate said pelletizer-mixer under good pelleting conditions and regulating the black and liquid feed rates so as to maintain said power relatively constant by increasing the liquid concentration in the black in said pelletizer-mixer when said power falls below and decreasing said concentration when said power rises above the standard value.

2. A process of wet pelleting carbon black comprising feeding said black and water at feed rates to provide a water concentration in the range of about 40 to 60 weight percent of the feed suitable for forming good pellets to a rotatable pelletizer in the form of a pug mill; rotating said mill at a speed to form said black into wet pellets; sensing the power required to rotate said pug mill while forming pellets under the foregoing conditions; and controlling the flow rate of water in response to the sensed power while maintaining the flow rate of black relatively constant so as to maintain said power relatively constant, increasing the water concentration when said power decreases and decreasing the water concentration when the power increases from said constant.

3. The process of claim 2 wherein said pelletizer is rotated by an electric motor and the current flowing to said motor is sensed and utilized as a measure of power.

4. The process of claim 2 wherein said water contains molasses in a concentration in the range of about 0.5 to 3 weight percent.

5. A process of wet pelleting carbon black comprising feeding said black and water at feed rates to provide a water concentration in the range of about 40 to 60 weight percent of the feed suitable for forming good pellets to a rotatable pelletizer in the form of a pug mill; rotating said mill at a speed to form said black into wet pellets; sensing the power required to rotate said pug mill while forming pellets under the foregoing conditions; and controlling the flow rate of black in response to the sensed power while maintaining the flow rate of water relatively constant so as to maintain said power relatively constant, decreasing the black concentration when said power decreases and increasing the black concentration when said power increases from said constant.

6. The process of claim 5 wherein said water contains molasses in a concentration in the range of about 0.5 to 3 weight percent.

7. A process of wet pelleting carbon black wherein said black is produced at varying rates, recovered, and fed to a surge zone, the steps comprising:
 (a) feeding said black and aqueous liquid at feed rates to provide an optimum liquid concentration in the range of 42 to 58 weight percent for forming good pellets under pellet forming conditions to a pelletizer-mixer being rotated by an electric motor;
 (b) sensing the electric power consumed by said motor in rotating said pelletizer-mixer, wherein said power increases with increases in said liquid concentration and decreases with decreases in said liquid concentration;
 (c) regulating the feed rate of one of said carbon black and said liquid in response to the sensed power consumption while maintaining the other relatively constant so as to maintain said liquid concentration relatively constant increasing the liquid concentration when the consumed power decreases from a standard value and decreasing the liquid concentration when the consumed power increases above said standard value; and
 (d) as the level of black in said surge zone rises and falls with varying production rates, periodically sensing the black level in said zone and varying one of the feed rate of black and the feed rate of water to compensate for increases and decreases in the black level from a given intermediate level, whereby the power varies and a corresponding increase in the other flow rate is made to substantially restore said liquid concentration.

8. The process of claim 7 wherein said liquid feed is held substantially constant and said black feed is varied, said liquid feed being varied step-wise as said carbon black level varies.

9. Apparatus for controlling the wet pelleting of carbon black, comprising in combination
 (a) a horizontally positioned rotatable pelletizer-mixer having a carbon black feed line and a liquid feed line leading thereinto;
 (b) an electric motor operatively connected in a circuit with an electric power source and rotatably connected with said pelletizer;
 (c) a feeder in said carbon black feed line;
 (d) a motor valve in said liquid feed line;
 (e) first means connected with said circuit for sensing the power consumed in operating said motor and translating the sensed power into a pneumatic signal proportional to the sensed power;
 (f) second means for sensing the flow rate in one of said liquid feed line and said feeder and emitting a pneumatic signal proportional thereto; and (g) third means for receiving the signals from said first and second means and controlling one of said feeder and said motor valve in response thereto so as to maintain said power to said electric motor substantially constant by decreasing the concentration of said liquid when said power increases, and increasing the concentration of said liquid when said power decreases.

10. The apparatus of claim 9 wherein said feeder is a star valve operated by an electric motor thru a speed transmission; (f) comprises a speed transmitter sensitive to the speed of rotation of said feeder, a first controller sensitive to said transmitter and in operative control of said transmission; (g) comprises said first controller; and including (h) a flow transmitter sensitive to the rate of flow in said liquid line;
(i) a second controller sensitive to said flow transmitter in operating control of said motor valve;
(j) a surge chamber on the upstream end of said black feed line;
(k) level indicating means at several black levels in said surge chamber; and
(l) means sensitive to said level indicating means for resetting said second controller to increase and decrease the liquid flow rate step-wise as the black level rises and falls, respectively, from level to level.

11. The apparatus of claim 9 wherein said first means comprises an electro-pneumatic transducer.

12. The apparatus of claim 9 including a pulsation damper connected to receive the signal from said first means and transmit the damped signal to said third means.

13. The apparatus of claim 9 wherein said first means comprises a thermal converter and said third means comprises a receiver-controller.

14. Apparatus for controlling the wet pelleting of carbon black, comprising in combination
(a) a horizontally disposed rotatable pelletizer-mixer having a carbon black feed line and a liquid feed line leading thereinto;
(b) an electric motor operatively connected in a circuit with an electric power source and operatively connected with said pelletizer for rotating same;
(c) a feeder in said carbon black line;
(d) a motor valve in said liquid feed line;
(e) a flow transmitter in said liquid feed line adapted to emit a pneumatic signal proportional to rate of flow therein;

(f) first means for sensing amperes flowing thru said circuit and translating same to a corresponding pneumatic signal;
(g) a primary receiver-controller operatively connected to receive aforesaid pneumatic signal and emit a pneumatic demand signal proportional to the sensed amperage; and
(h) a secondary receiver-controller operatively connected to receive said demand signal and the signal from said flow sensing element and to emit a signal to said motor valve which increases the flow rate of water when the said demand signal is below a set value and decreases said flow rate when said demand signal is above said set value thereby increasing water flow rate when the sensed amperage decreases and decreasing water flow rate when the sensed amperage increases.

15. The apparatus of claim 14 including a pressure pulsation damper connected intermediate said first means and said primary receiver-controller.

16. The apparatus of claim 14 including a step-down transformer intermediate said circuit and said first means.

17. Apparatus for controlling the wet pelleting of carbon black which comprises, in combination
(a) a horizontally disposed rotatable pelletizer-mixer having a feed line for carbon black and a feed line for aqueous liquid;
(b) variable flow control means in said feed line for liquid;
(c) flow control means in said feed line for black;
(d) electric power means for rotating said pelletizer-mixer; and
(e) means for sensing the electric power consumed in rotating said pelletizer-mixer and controlling said variable flow control means so as to maintain the consumed power relatively constant by increasing flow when said consumed power decreases and decreasing flow when said consumed power increases.

References Cited by the Examiner

UNITED STATES PATENTS

| | | | |
|---|---|---|---|
| 2,596,672 | 5/1952 | Gard et al. | 18—1 |
| 2,626,786 | 1/1953 | McGlothlin | 137—92 X |
| 2,800,399 | 7/1957 | King | 18—1 |
| 3,034,421 | 5/1962 | Pence | 18—1 |

NORMAN YUDKOFF, *Primary Examiner.*

S. J. EMERY, A. J. ADAMCIK, *Assistant Examiners.*